US008582279B2

(12) United States Patent
Maloney et al.

(10) Patent No.: US 8,582,279 B2

(45) Date of Patent: Nov. 12, 2013

(54) SIDE ACCESSIBLE CIRCUIT BREAKER TO BUS CONNECTIONS

(75) Inventors: James Gerard Maloney, Industry, PA (US); Eric Alan Samuelson, Springfield, IL (US)

(73) Assignee: Eaton Corporation, Cleveland, OH (US)

( * ) Notice: Subject to any disclaimer, the term of this patent is extended or adjusted under 35 U.S.C. 154(b) by 380 days.

(21) Appl. No.: 13/021,404

(22) Filed: Feb. 4, 2011

(65) Prior Publication Data

US 2012/0200986 A1 Aug. 9, 2012

(51) Int. Cl.

| | |
|---|---|
| ***H02B 1/20*** | (2006.01) |
| ***H01H 71/08*** | (2006.01) |
| *H02B 1/04* | (2006.01) |
| *H01R 4/60* | (2006.01) |

(52) U.S. Cl.

CPC .................................... *H01H 71/08* (2013.01)

USPC ........... 361/652; 361/634; 361/636; 361/656; 439/212; 200/284

(58) Field of Classification Search

USPC .......................... 361/600–678; 439/212–213

See application file for complete search history.

(56) References Cited

U.S. PATENT DOCUMENTS

| | | | | |
|---|---|---|---|---|
| 3,263,132 A * | 7/1966 | Bangert, Jr. | ................... | 361/635 |
| 3,309,581 A * | 3/1967 | Klein | ............................ | 361/635 |
| 4,004,197 A * | 1/1977 | Hawkes, Jr. | ................... | 361/636 |
| 4,157,582 A * | 6/1979 | Myers | ........................... | 361/636 |
| 4,646,199 A * | 2/1987 | M'Sadoques et al. | ........ | 361/634 |
| 7,553,175 B1 * | 6/2009 | Benson et al. | ................ | 439/212 |
| 2007/0192817 A1 * | 8/2007 | Landry et al. | ................ | 725/119 |
| 2009/0066270 A1 * | 3/2009 | Dause et al. | .................... | 318/34 |

* cited by examiner

*Primary Examiner* — Zachary M Pape

(74) *Attorney, Agent, or Firm* — Eckert Seamans Cherin & Mellott, LLC; John P. Powers

(57) ABSTRACT

A load center assembly comprising a main circuit breaker configured to be connected with bus plates through side openings in the main circuit breaker is described. The openings in the main circuit breaker comprise plug-on clips by which the bus plates connect. The plug-on clips are configured to use friction to grasp the bus plates as the bus plates are slidably inserted between the jaws of the plug-on clips.

22 Claims, 5 Drawing Sheets

SIDE ACCESSIBLE CIRCUIT BREAKER TO BUS CONNECTIONS

FIELD

The present disclosure relates to circuit breakers. In particular, it relates to a side accessible circuit breaker to bus connections.

BACKGROUND

Load centers (defined as distribution boards or panel boards where electrical power sources are routed through, protected by circuit breakers and/or fuses) are used as a distribution center for providing electrical power from a power source (e.g., electrical general, power company). Circuit breakers can act as a safety feature by providing a method of removing power from the load centers. Furthermore, circuit breakers can be used as a manually operated on and off switch, or provide automatic over-current protection in case such over-current conditions occur.

A load center typically comprises a main circuit breaker capable of removing power from the entire load center, and further branch circuit breakers to remove power from selected circuits without removing power from the entire load center. When load centers are built, main circuit breakers are typically installed at a factory level, since the main circuit breakers use hardware such as screws, nuts, and washers to electrically mount and connect to buses. The necessity of such additional hardware results in purchasing, manufacturing, accountability, inventory, and real-estate for storage of the additional hardware, all of which ultimately result in additional cost.

SUMMARY

According to a first aspect, a circuit breaker is described, the circuit breaker comprising: one or more openings on a side wall section of the circuit breaker, the one or more openings providing access to conductive contact points of the circuit breaker, the conductive contact points being connectable with one or more bus plates, the side wall section facing the one or more bus plates when connected; and plug-on clips made of conductive material and removably connectable with the conductive contact points of the circuit breaker in the one or more openings, the plug-on clips being electrically connectable with the circuit breaker and removably connectable with the one or more bus plates.

According to a second aspect, a load center interior assembly is described, the load center comprising: a chassis for mounting components of the load center; the circuit breaker according to the first aspect, the circuit breaker mounted on the chassis; and one or more bus plates mounted on the chassis, an end section of each of the one or more bus plates connected with the circuit breaker and the plug-on clips, the one or more bus plates being slidably connected with the plug-on clips such that the end section of the one or more bus plates is embraced by and conductively connected with the plug-on clips.

According to a third aspect, a method of connecting a circuit breaker to a bus plate, the method comprising: providing a bus plate; providing a circuit breaker with an opening on a side wall section of the circuit breaker, the opening providing access to a conductive contact point of the circuit breaker; slidably connecting the bus plate with the conductive contact point of the circuit breaker through the opening on the side wall section such that the circuit breaker and the bus plate make electrical contact; providing a plug-on clip; and attaching the plug-on clip in the opening of the circuit breaker such that the plug-on clip is electrically connected with the conductive contact point of the circuit breaker, the plug-on clip being connected between the bus and the conductive contact point of the circuit breaker.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure. Although the drawings illustrated in the present disclosure are shown in a configuration that provides a conductive path for two different polarities (often called single phase), the embodiments of the present disclosure are also applicable to a configuration that provides a conductive path for three different polarities (often called three phase). Drawings of such three phase systems can employ embodiments similar to those shown in the present drawings with main circuit breaker configured to accept three bus plates.

FIG. 2 shows an exploded perspective view of the main circuit breaker, bus plates, and plug-on clips in a load center interior.

FIG. 3 shows a perspective view of a section of the bus plates with the plug-on clips attached.

FIG. 4 shows a perspective view of the bus plates connected to the main circuit breakers using plug-on clips.

FIG. 5 shows a perspective view of a load center interior with the buses connected to the main circuit breaker without the use of screws and/or nuts.

DETAILED DESCRIPTION

In the present disclosure, a "circuit breaker" is defined (according to the National Electric Code) as a device designed to open and close a circuit by non-automatic means (e.g., manually) and to open the circuit automatically on a predetermined over-current without damage to itself when properly applied within its rating. A "load center" is intended to mean distribution boards or panel boards where electrical power sources are routed through, protected by circuit breakers and/or fuses.

Figure 1:
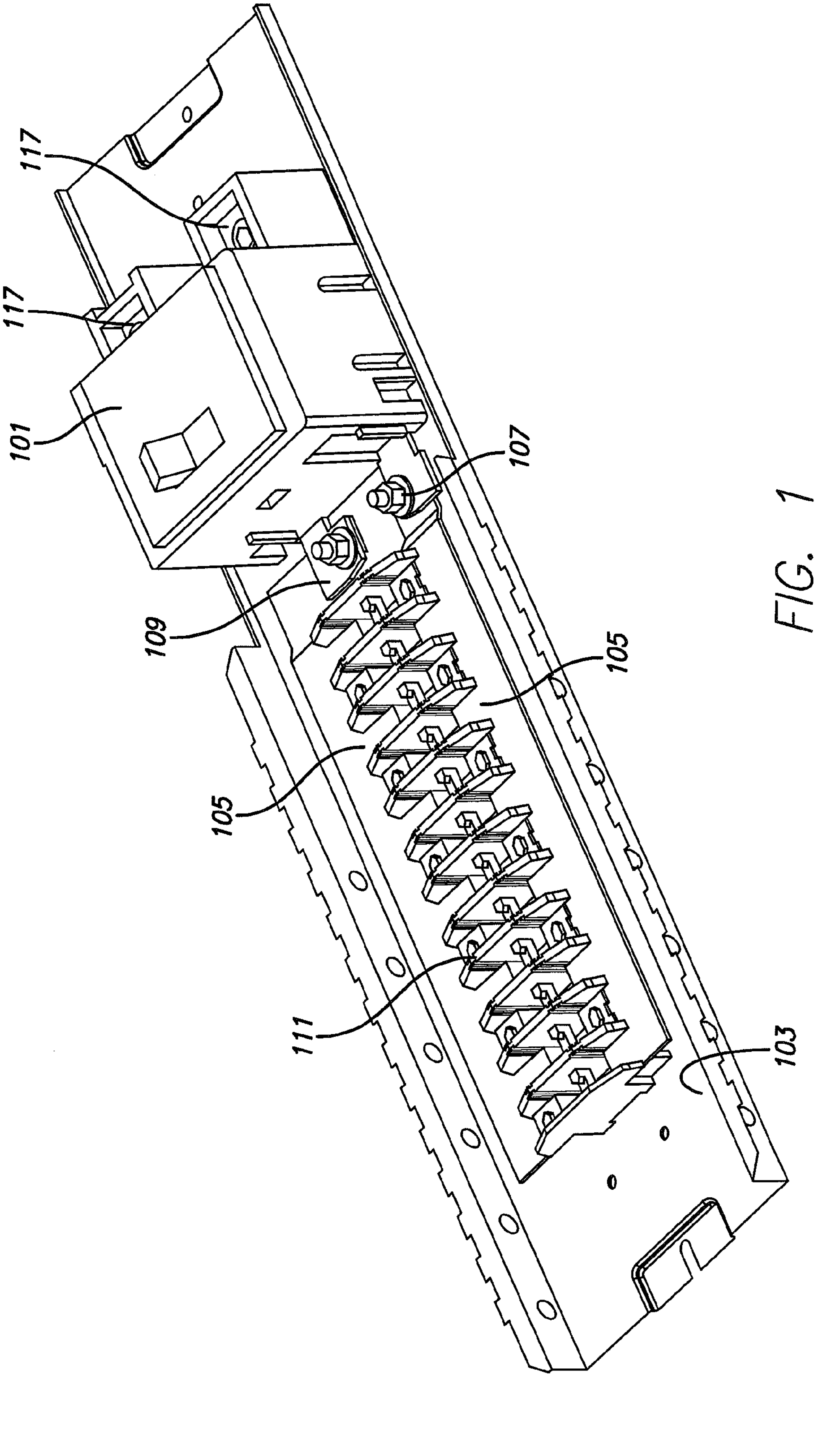
FIG. 1 PRIOR ART
FIG. 1 shows a perspective view of a common main circuit breaker in a load center interior and components therein, where bus plates are connected to the main circuit breaker with screws and nuts.

In FIG. 1, a chassis (103) of a load center is shown with a main circuit breaker (101) and a pair of bus plates (105) having differing polarities mounted on the chassis (103). Mounting studs (117) can be used to mount the main circuit breaker (101) onto the chassis (103) and the chassis (103) can be mounted in a casing (not shown) which can then be mounted on walls in an electrical enclosure (not shown), or other desired locations.

A branch circuit breaker insulator (111) is positioned between the pair of bus plates (105). The branch circuit breaker insulator (111) is configured to accept branch circuit breakers, which can be, by way of example and not of limitation, plug-on or bolt-on circuit breakers. In addition, the branch circuit breaker insulator (111) separates the bus plates (105) into sections for each of the branch circuit breakers. The structure shown in FIG. 1 allows, for example, twelve separate branch circuit breakers to be mounted on each bus plate, or twenty four total separate branch circuit breakers. The bus plates (105) are used to distribute current to various circuits defined by the branch circuit breakers.

The branch circuit breakers are adapted to cut off current to only the circuit connected through the specific branch circuit breaker, thus removing electrical power only from a selected current distribution without removing power from the entire bus plate (105). The main circuit breaker (101) is configured to remove all power from the entire pair of bus plates (105), thus ultimately also removing power from the individual branch circuits. The branch circuit breaker insulator (111) can also be used to fix the bus plates (105) in place on the chassis (103).

As further shown in FIG. 1, screws and nuts (107) are used to connect the buses (105) to conductive plates (109) on the main circuit breaker (101). Incoming power from a power source (e.g., electrical general, power company) can be connected to a utility feed connector lug (117), which in turn, is connected to a 'line bus' inside of the main circuit breaker (101). The line bus is similar to the conductive plates (109), except it is located inside the main circuit breaker (101). Thus, inside the main circuit breaker (101), a continuous electrical path is provided, starting from the connector lug (117) to the line bus, through the circuit breaker, to the conductive plates (109), thereby establishing an electrical path from the power source to the bus plates (105).

Figure 2:
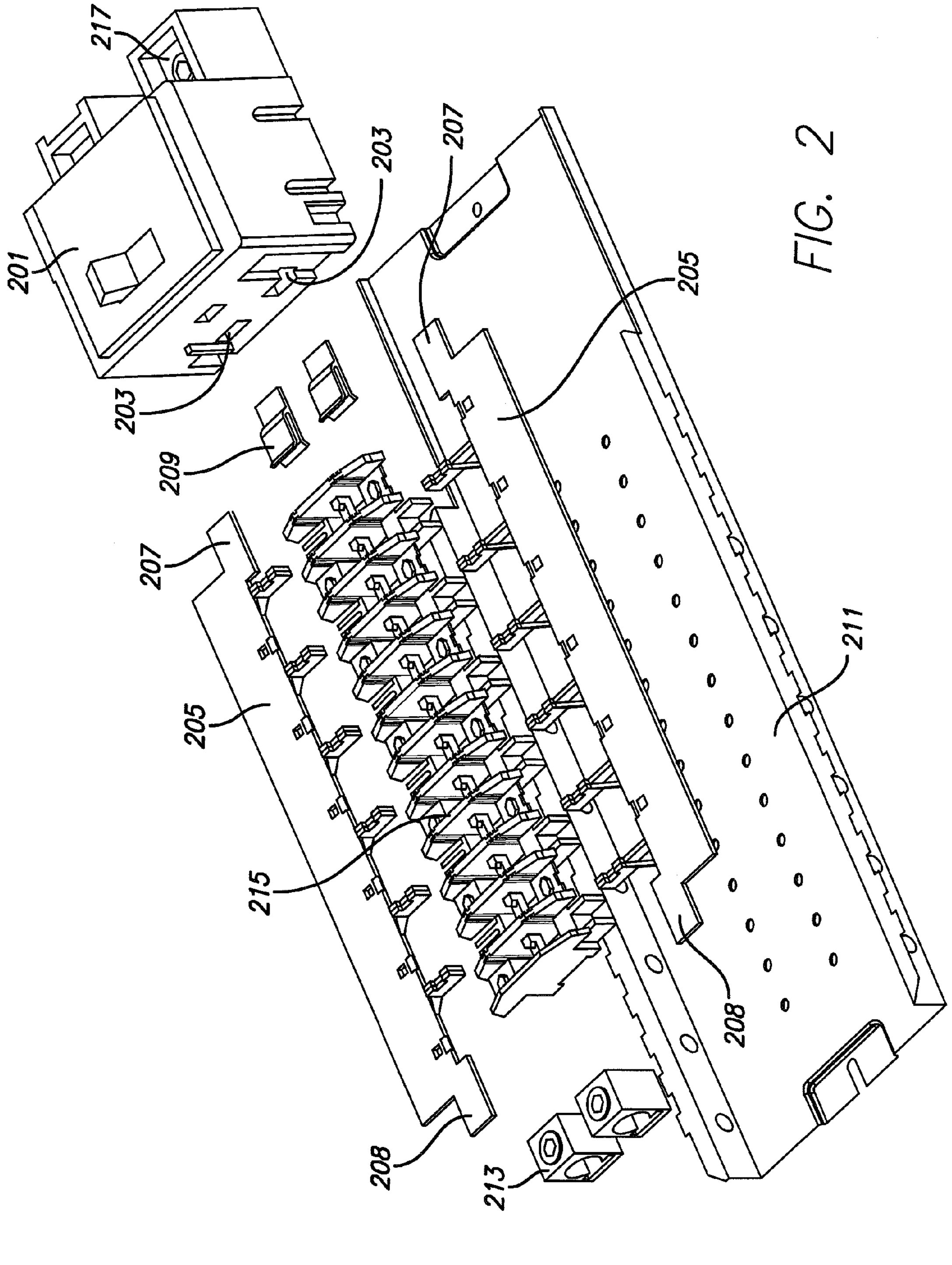
FIGS. 2-5 show perspective views of a main circuit breaker in a load center interior connected with bus plates without the use of screws and/or nuts, in accordance with embodiments of the present disclosure. In particular.

FIG. 2 shows a perspective exploded view of a load center assembly according to an embodiment of the present disclosure. The load center interior assembly comprises a chassis (211), also known as a back pan, in which several elements of the load center are mounted. The chassis (211) can be mounted in a load center enclosure or casing (not shown) which can then be mounted on walls or other desired locations. Some of the elements of the load center interior assembly of FIG. 2 are a main circuit breaker (201), line connector lugs (217) for connecting the incoming power from the utility feed or other sources, bus plates (205), plug-on clips (209), feed through connector lugs (213) that can be used to connect power to subsequent down-stream load centers or other distribution devices.

Differently from the arrangement of FIG. 1 where electrical contact between the main circuit breaker (101) and the bus plates (105) is obtained by way of screwed conductive plates (109), in an embodiment of FIG. 2, electrical contact between the circuit breaker (201) and the bus plates (205) is obtained by way of the plug-on clips (209).

A first difference between FIG. 1 and an embodiment of the present disclosure lies in the configuration of the circuit breaker. As shown in FIG. 2, a side of the main circuit breaker (201) facing the bus plates (205) (when installed) comprises openings (203) that provide access to conductive contact points, which in turn, are connected with the line connector lugs (217). The conductive contact points are adapted to be electrically connected with the plug-on clips (209) and the end sections (207) of the bus plates (205). The openings (203) can be, by way of example and not of limitation, rectangular in shape such that the plug-on clips (209) can fit in the openings.

Figure 3:
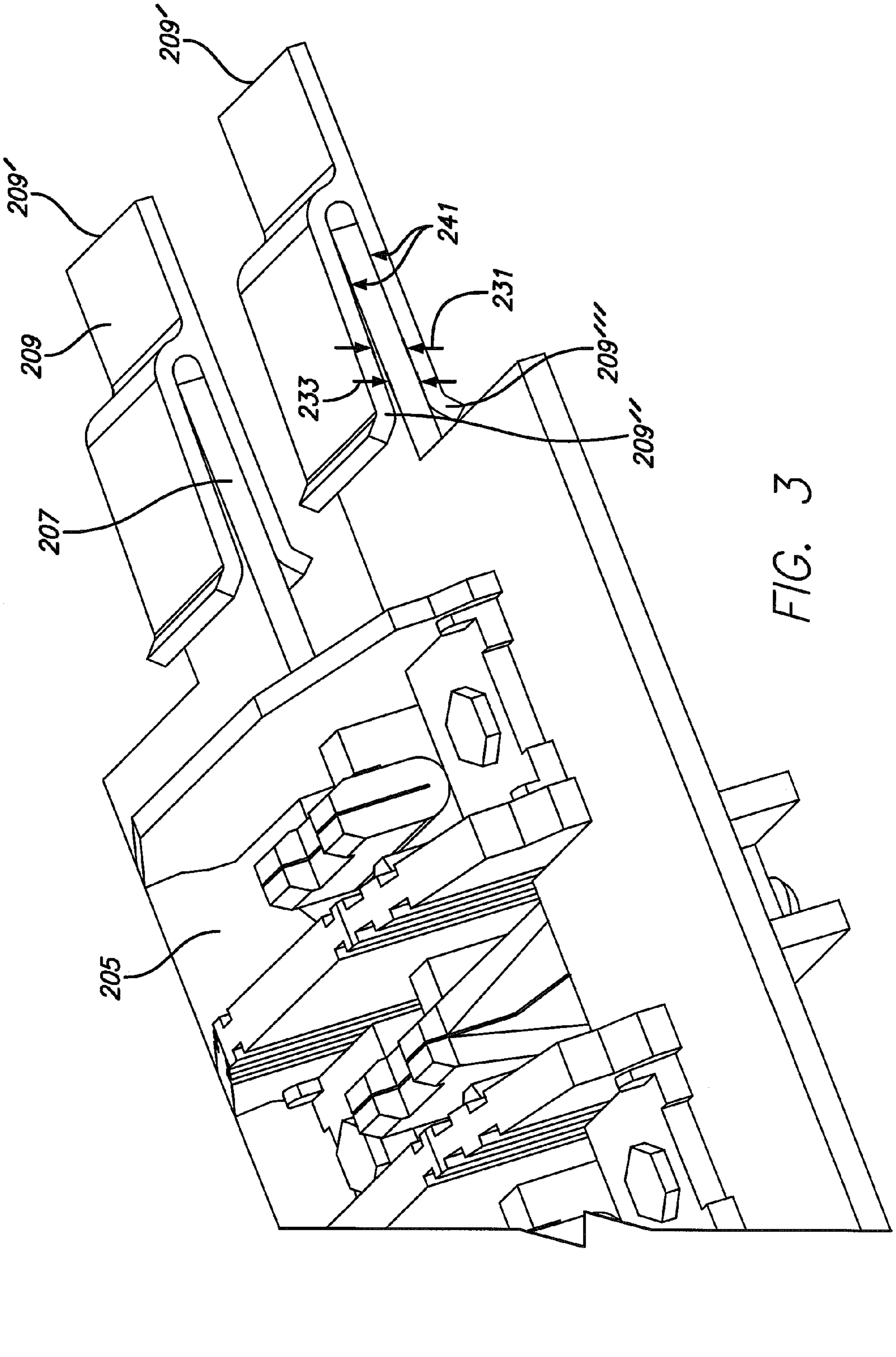

A second difference between FIG. 1 and an embodiment of the present disclosure lies in the presence and shape of the plug-on clips (209) instead of the conductive plates (109) shown in FIG. 1. As shown in FIG. 3, which shows a close-up view of the bus plates (205), the plug-on clips (209) are substantially jaw-shaped and form a spring jaw such that each of the jaws applies pressure inwardly to clamp the bus ends (207), thus allowing full electrical current through the improved friction joint (241) connection. A person having ordinary skill in the art would understand such plug-on clips (209) to be referred to as a "plug-on terminal jaw" or a "terminal spring jaw". The configuration of such plug-on clip (209) provides for compact mounting and ease for replacing. Throughout the present application, a side of the plug-on clips (209) adapted to be connected to the main circuit breaker (201) will be referred to as circuit breaker end (209'), while a side of the plug-on clips (209) adapted to be connect to the bus plates (205) will be referred to as first jaw end (209") and second jaw end (209'").

The plug-on clips (209) can be made of any conductive material or metal (e.g., copper, aluminum, bronze). In addition, the plug-on clips (209) can include protective surface plating by a conductive material, for example, copper, tin, silver or gold. Although not required, in case where the plug-on clips (209) are made of aluminum and the bus plates (205) are made of copper, the plug-on clips (209) can be coated with tin to avoid potential chemical reaction between the bus plates (205) and the plug-on clips (209). The type of material used can vary depending on factors such as the size of the elements comprising the load center.

The plug-on clips (209) provide a conductive medium between the bus plates (205) and the main circuit breaker (201), thus connecting the bus plates (205) and the main circuit breaker (201) both electrically and physically. The first and second jaw ends (209")(209'") are adapted to slide, when installed, over end sections (207) of the bus plates (205) such that the first and second jaw ends (209")(209'") embrace such end sections (207) with a spring-like pressure from the spring jaws. The first and second jaw ends (209")(209'") are configured to be resilient to further enhance embracement of the bus plates (205), thus providing sufficient electrical contact on both sides (upper and lower) of the end sections (207). It is noted that FIG. 3 shows the plug-on clips (209) attached to the bus plates (205) to illustrate the embraced, conforming connection.

When the plug-on clips (209) are in an uninstalled state, the first jaw end (209") and the second jaw end (209'") are separated by a spacing (231) slightly less than the thickness (233) of the bus plates (205) at the end sections (207) of the bus plates (205). Such dimensions can enable an interference fit between the end sections (207) of the bus plates (205) and the plug-on clips (209), which can be configured such that when installed, the first and second jaws (209")(209'") conform around the bus end sections (207), further ensuring sufficient contact with one another. In addition to the spacing (231) and the thickness (233), the resilient spring characteristics of the first and second jaws (209")(209'") further enforce the embraceability of the plug-on clips (209).

A third difference between FIG. 1 and an embodiment of the present disclosure lies in the shape of the bus plates (205). Although the shape of the bus plates (205) can be of any size and shape so long as the end portions (207) of bus plates (205) align with the openings (203) of the main circuit breaker and can feasibly be mounted on the chassis (211), the bus plates (205) of the present disclosure are symmetrical such that the end portion (207) and a second end portion (208) are symmetrical. In addition, the pair of bus plates (205) is also symmetrical with one another. Such symmetrical dimensions enable the second end portion (208) of the bus plates (205) to connect with feed-through lugs (213).

Connections between the bus plates (205), plug-on clips (209) and main circuit breaker (201) will now be discussed in detail. The plug-on clips (209) are first installed in the openings (203) of the main circuit breaker (201), for example, during manufacturing of the main circuit breaker (201), before the main circuit breaker (201) cover is mounted. When the plug-on clips (209) are installed, all or a substantial portion of the plug-on clips (209) are positioned inside the openings of the main circuit breaker (201) such that only the first and second jaw ends (209")(209"') of the plug-on clips (209) are visible and/or exposed from the exterior openings (203). Thus, once the plug-on clips (209) are installed in the main circuit breaker (201), the plug-on clips (209) become part of the main circuit breaker (201) assembly. Alternatively, the plug-on clips (209) can further comprise a screw-on/bolt-on attachment (not shown) to hold the plug-on clips (209) in place, within the main circuit breaker (201).

Figure 4:
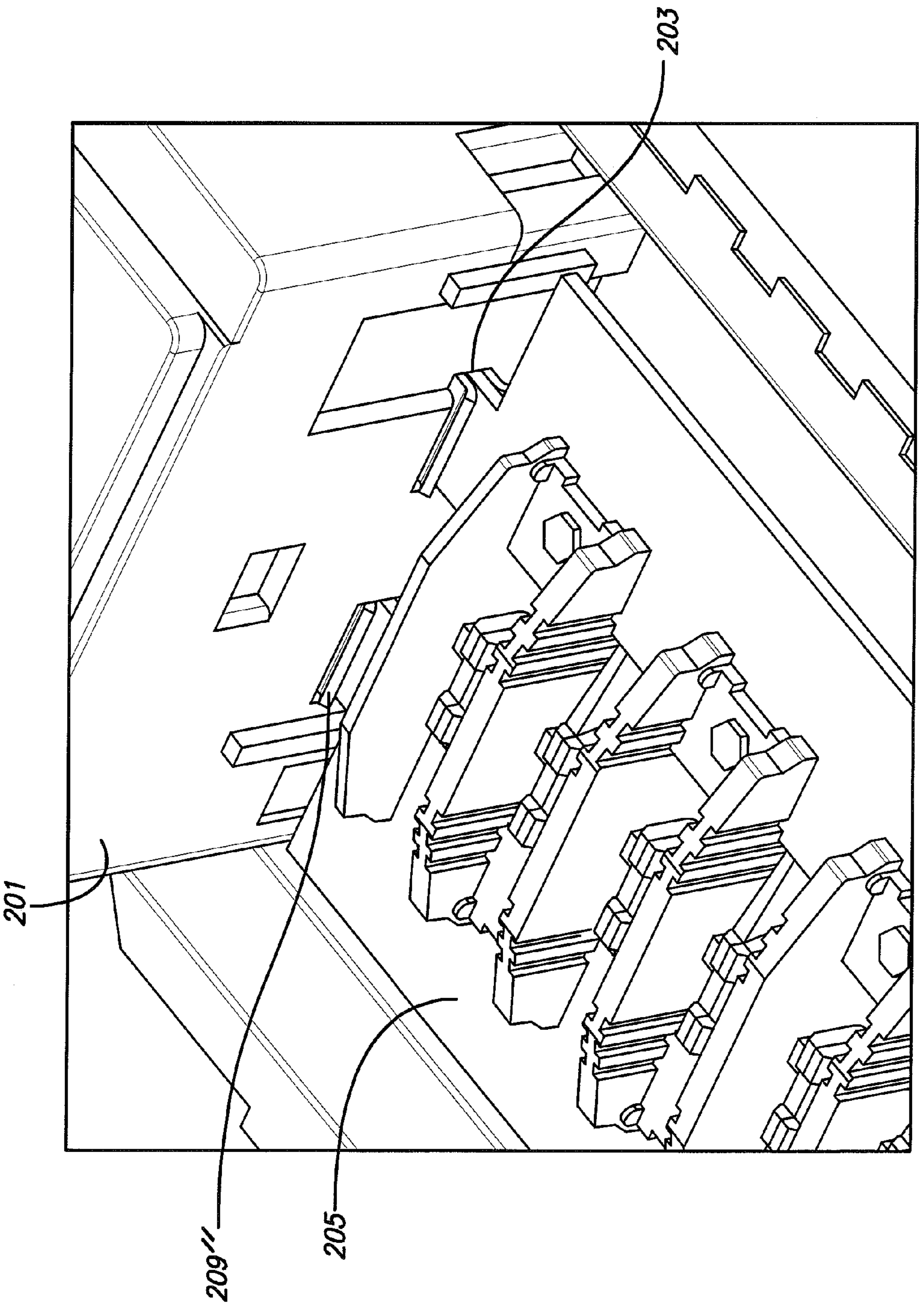
Figure 5:
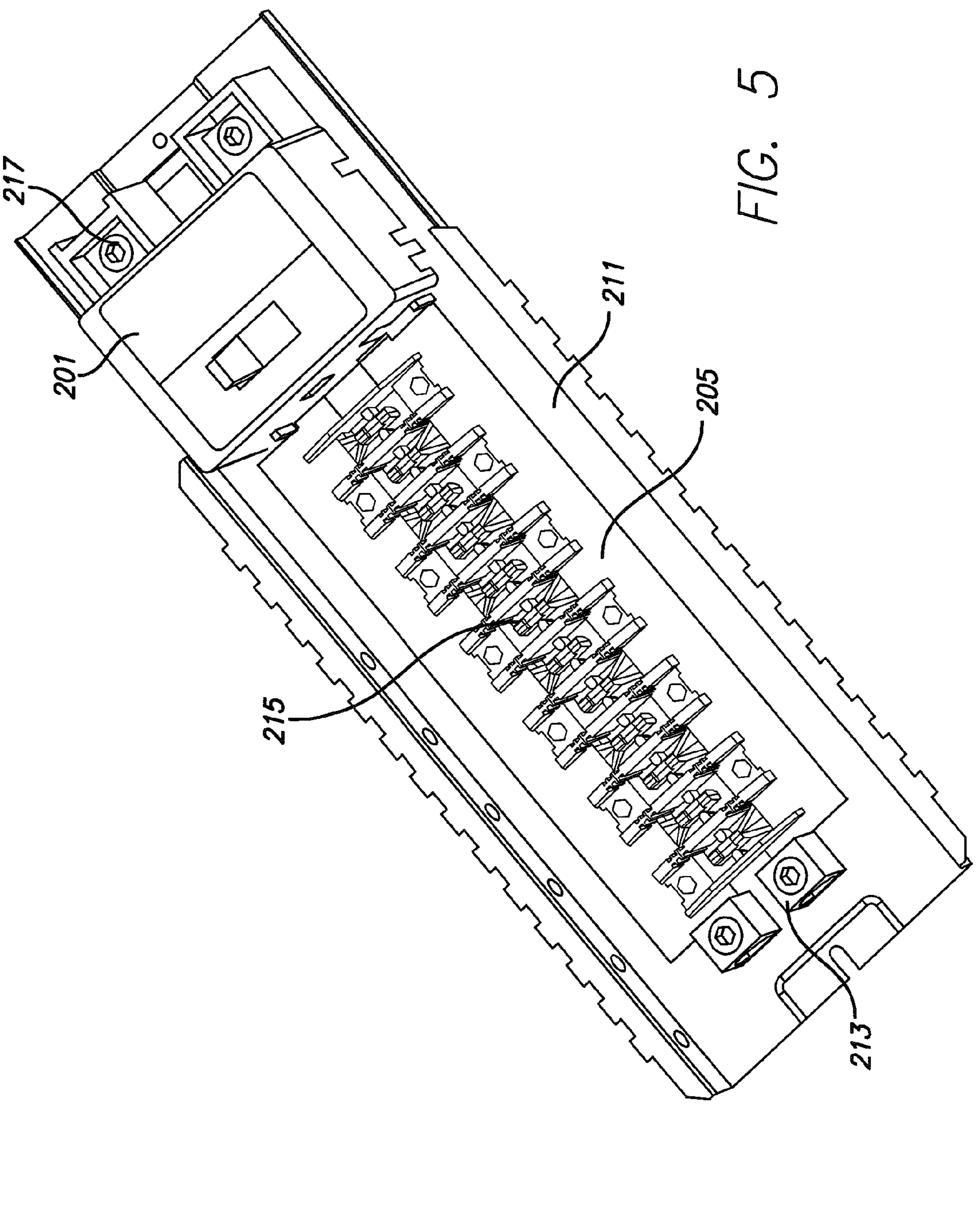

When the main circuit breaker (201) is installed in the load center, the main circuit breaker (201) is removably connected to the end portion (207) of the bus plates (205) by way of the plug-on clips (209), such that a substantial amount of the end portion (207) of the bus plates (205) is inserted into the jaws of the plug-on clips (209). FIGS. 4-5 show the main circuit breaker (201) slidably installed and connected with the bus plates (205) where the connection is formed by way of the plug-on clips (209).

It should also be noted that, differently from the arrangement of FIG. 1 where the main circuit breaker (101) is installed in the load center using tools, by way of screwed conductive plates (109), the installation of the main circuit breaker (201) on the load center in the embodiments of FIGS. 2-5 can be accomplished as described in the previous paragraphs without the use of tools or additional hardware that can require the use of tools, thus enabling a 'field-level' installation.

The load center assembly can further comprise an enclosure and a protective cover to enclose the entire chassis (211) and the elements mounted on the chassis (211). Such enclosure provides electrical protection to personnel and minimizes collection of dust and undesired debris on the elements of the load center.

The embodiments of the present disclosure describe a load center assembly that can reduce the amount of steel and other metals that are utilized for the manufacturing and assembling of the load centers. Such reductions can result, by way of example and not of limitation, the bus plates (205) using less metal, and eliminating the use of nuts and screws; or the plug-on clips (209) taking up less space within the circuit breaker. Such reductions can contribute to global efforts in environmentally friendly manufacturing processes. Additionally, reliability of load centers can be improved as a result of reduced parts and components involved in the assembly. Plug-on clips (209) can enable a more consistent installation of the load center assembly due to the possibility of improperly torqued or loosened nuts being substantially eliminated. Therefore, automated load center assembling can be implemented.

Although the present disclosure provides examples for load centers comprising two bus plates (205), which are applicable to single phase load centers, the embodiments of the present disclosure can also be applicable to three phase load centers comprising three bus plates.

The examples set forth above are provided to give those of ordinary skill in the art a complete disclosure and description of how to make and use the embodiments of the side accessible circuit breaker to bus connections of the disclosure, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A main circuit breaker structured to be mounted on a chassis, the chassis comprising a mounting surface facing the main circuit breaker, the mounting surface being disposed in a first plane, the main circuit breaker comprising:

one or more openings on a side wall section of the main circuit breaker, the one or more openings providing access to conductive contact points of the main circuit breaker, the conductive contact points of the main circuit breaker being connectable with one or more bus plates disposed parallel to the first plane, the side wall section facing the one or more bus plates when connected; and plug-on clips made of conductive material and removably connectable with the conductive contact points of the main circuit breaker in the one or more openings, the plug-on clips being electrically connectable with the main circuit breaker and removably connectable with the one or more bus plates;

wherein the one or more openings terminate at an exterior surface of the side wall section, the exterior surface being disposed in a second plane normal to the first plane;

wherein the main circuit breaker further comprises another exterior surface opposite the exterior surface, the another exterior surface being disposed in a third plane, the third plane being normal to the first plane and parallel to the second plane;

wherein the one or more bus plates include an end section structured to terminate between the second plane and the third plane; and wherein each of the plug-on clips forms an opening structured to receive the end section of a corresponding one of the one or more bus plates and facing in a direction parallel to the first plane.

2. The main circuit breaker of claim 1, wherein a segment of the plug-on clips adapted to be connectable with the one or more bus plates is resilient.

3. The main circuit breaker of claim 2, wherein the resilient segment of the plug-on clips is adapted to conductively embrace the one or more bus plates on a top side and a bottom side thereof.

4. The main circuit breaker of claim 1, wherein the end section is a first end section disposed along a longitudinal axis, the longitudinal axis being parallel to the first plane;

wherein each of the one or more bus plates includes a second end section opposite the first end section; and wherein the second end section is disposed along said longitudinal axis.

5. The main circuit breaker of claim 4, wherein each of the plug-on clips includes a first jaw and a second jaw opposite the first jaw, the first and second jaws forming said opening facing in the direction parallel to the first plane; and wherein the one or more bus plates further include a first surface and a second surface opposite the first surface, the first surface being disposed in a fourth plane and the second surface being disposed in a fifth plane, the first jaw being structured to engage the first surface and the second jaw being structured to engage the second surface, the fourth and fifth planes being parallel to the first plane.

6. The main circuit breaker of claim 5, wherein each of the one or more bus plates is elongated in a direction parallel to the longitudinal axis.

7. A load center interior assembly comprising:

a chassis for mounting components of the load center; and a main circuit breaker mounted on the chassis, the main circuit breaker comprising:

one or more openings on a side wall section of the main circuit breaker, the one or more openings providing access to conductive contact points of the main circuit breaker, the conductive contact points of the main circuit breaker being connectable with one or more bus plates disposed parallel to a first plane, the side wall section facing the one or more bus plates when connected; and plug-on clips made of conductive material and removably connectable with the conductive contact points of the main circuit breaker in the one or more openings, the plug-on clips being electrically connectable with the main circuit breaker and removably connectable with the one or more bus plates;

wherein the chassis comprises a mounting surface facing the main circuit breaker, the mounting surface being disposed in the first plane;

wherein the one or more openings terminate at an exterior surface of the side wall section, the exterior surface being disposed in a second plane normal to the first plane;

wherein the one or more bus plates are mounted on the chassis, an end section of each of the one or more bus plates connected with the main circuit breaker and the plug-on clips, the one or more bus plates being slidably connected with the plug-on clips such that the end section of the one or more bus plates terminates between the second plane and a third plane and is embraced by and conductively connected with the plug-on clips;

wherein the main circuit breaker further comprises another exterior surface opposite the exterior surface, the another exterior surface being disposed in the third plane, the third plane being normal to the first plane and parallel to the second plane; and wherein each of the plug-on clips forms an opening receiving the end section of a corresponding one of the one or more bus plates and facing in a direction parallel to the first plane.

8. The assembly of claim 7, wherein the plug-on clips are located in the one or more openings of the main circuit breaker.

9. The assembly of claim 7, wherein the one or more bus plates are connected with the conductive contact points of the main circuit breaker through the plug-on clips.

10. The assembly of claim 7, wherein the assembly is contained inside an enclosure.

11. The assembly of claim 10, wherein the assembly is mounted on a wall.

12. The assembly of claim 10, wherein the assembly is a mobile load center assembly.

13. The assembly of claim 7, wherein the bus plates are made from a material selected from the group consisting of: copper, aluminum, bronze, silver and gold.

14. The assembly of claim 7, wherein the bus plates are surface plated with a material selected from the group consisting of: copper, tin, silver and gold.

15. The assembly of claim 7, wherein the end section is a first end section disposed along a longitudinal axis, the longitudinal axis being parallel to the first plane; wherein each of the one or more bus plates includes a second end section opposite the first end section; and wherein the second end section is disposed along said longitudinal axis.

16. The assembly of claim 15, wherein each of the plug-on clips includes a first jaw and a second jaw opposite the first jaw, the first and second jaws forming said opening facing in the direction parallel to the first plane; and wherein the one or more bus plates further include a first surface and a second surface opposite the first surface, the first surface being disposed in a fourth plane and the second surface being disposed in a fifth plane, the first jaw being structured to engage the first surface and the second jaw being structured to engage the second surface, the fourth and fifth planes being parallel to the first plane.

17. The assembly of claim 15, wherein each of the one or more bus plates is elongated in a direction parallel to the longitudinal axis.

18. A method of connecting a main circuit breaker to a bus plate, the method comprising:

providing a bus plate disposed parallel to a first plane;

mounting the bus plate on a chassis comprising a mounting surface facing the main circuit breaker, the mounting surface being disposed in the first plane;

providing a main circuit breaker with an opening on a side wall section of the main circuit breaker, the opening providing access to a conductive contact point of the main circuit breaker;

terminating the opening at an exterior surface of the side wall section, the exterior surface being disposed in a second plane normal to the first plane, the main circuit breaker having another exterior surface opposite the exterior surface, the another exterior surface being disposed in a third plane, the third plane being normal to the first plane and parallel to the second plane;

providing a plug-on clip forming an opening receiving an end section of the bus plate and facing in a direction parallel to the first plane;

slidably connecting the bus plate with the conductive contact point of the main circuit breaker through the opening on the side wall section such that the main circuit breaker and the bus plate make electrical contact, the end section terminating between the second plane and the third plane; and attaching the plug-on clip in the opening of the main circuit breaker such that the plug-on clip is electrically connected with the conductive contact point of the main circuit breaker, the plug-on clip being connected between the bus plate and the conductive contact point of the main circuit breaker.

19. The method of claim 18, wherein the connecting is performed in the field.

20. The method of claim 18, further comprising employing a first end section as the end section; disposing the first end section along a longitudinal axis parallel to the first plane;

including with the bus plate a second end section opposite the first end section; and disposing the second end section along said longitudinal axis.

21. The method of claim 20, further comprising including with the plug-on clip a first jaw and a second jaw opposite the first jaw, the first and second jaws forming said opening facing in the direction parallel to the first plane; and further including with the bus plate a first surface and a second surface opposite the first surface, the first surface being disposed in a fourth plane and the second surface being disposed in a fifth plane, the first jaw being structured to engage the first surface and the second jaw being structured to engage the second surface, the fourth and fifth planes being parallel to the first plane.

22. The method of claim 20, further comprising elongating the bus plate in a direction parallel to the longitudinal axis.

* * * * *